Nov. 22, 1932.  B. NASTROM  1,888,513
POWER TAKE-OFF DEVICE
Filed Nov. 29, 1929  2 Sheets-Sheet 1
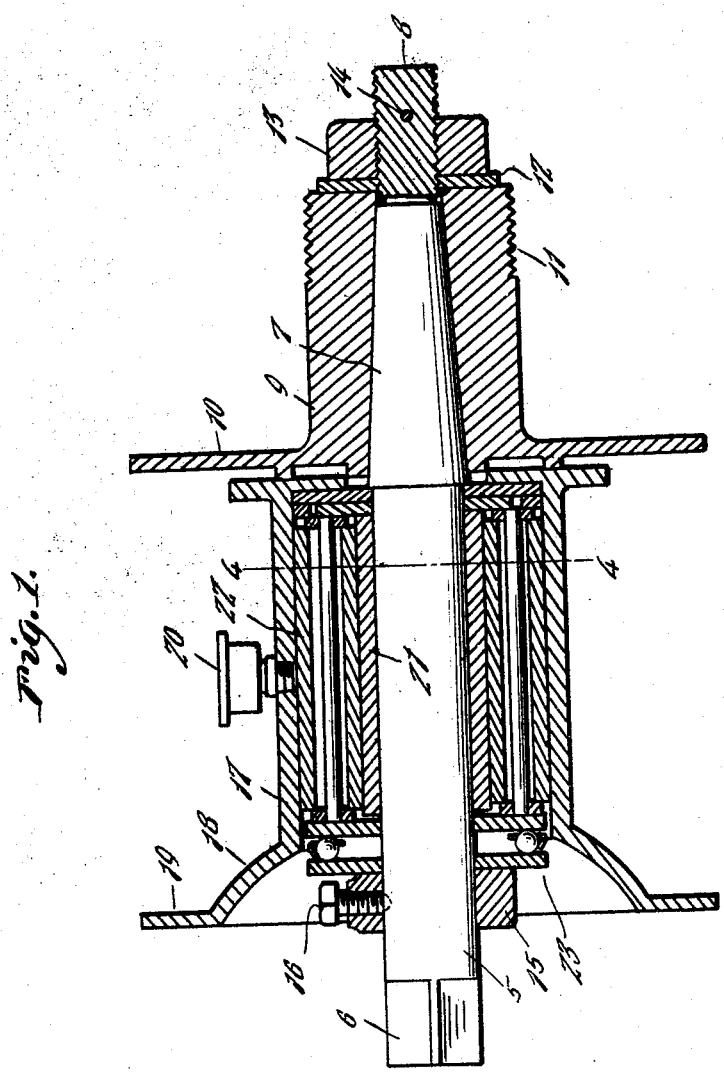
Inventor
*Bror Nastrom*
By *Clarence A. O'Brien*
Attorney

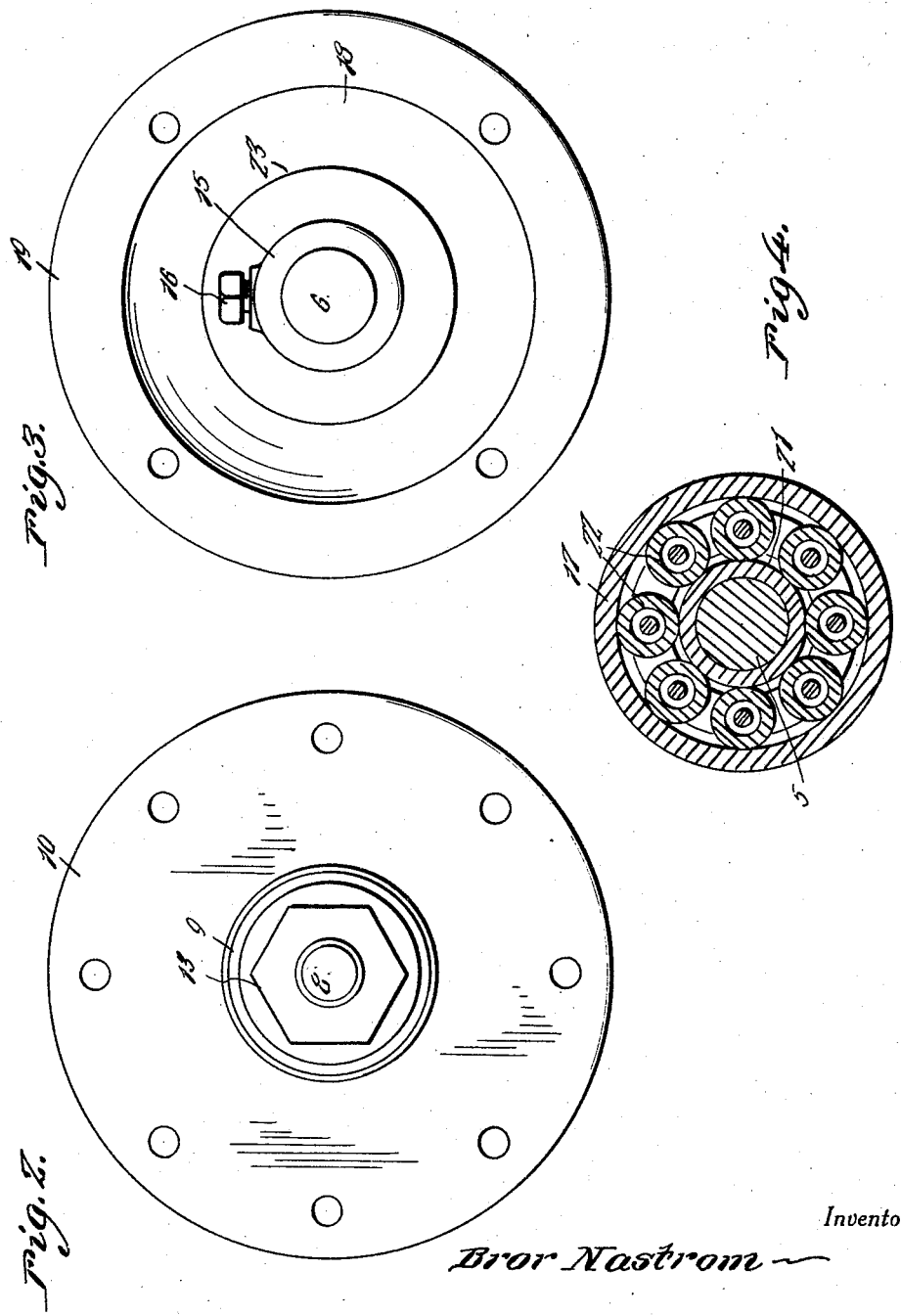

Patented Nov. 22, 1932

1,888,513

UNITED STATES PATENT OFFICE

BROR NASTROM, OF HOLDREGE, NEBRASKA

POWER TAKE-OFF DEVICE

Application filed November 29, 1929. Serial No. 410,488.

This invention relates to an improved power take-off device expressly designed for use in association with farm machinery, for instance, machinery of the type referred to as a domestic power plant.

It is a common practice now on farms and the like, to condition old discarded automobile engines, for instance the type used in connection with the old model T Fords. As a general rule, the automobile is stripped of the body and the engine is placed on appropriate supporting means. There are various ways of attaching different kinds of power take-off devices. For instance, some devices are coupled in the differential at the rear end of the propeller shaft. Other devices are attached to the axle. In some instances, the power take-off device is coupled to the crank shaft in front of the engine, and in other instances, the power take-off device is embodied in the universal joint just rear of the transmission.

The present form of the device is especially, but not necessarily, constructed to permit it to be fastened to the universal joint to take the place of the propeller shaft and this device is constructed to provide a housing for roller bearings wherein the roller bearings are arranged to accommodate a rotating shaft wherein the shaft is provided with means for detachable mounting of the various appliances adapted to transmit the power. These devices are generally in the form of a gear, pulley, or the like.

In the drawings:

Figure 1 is a longitudinal sectional view through a structure devised in accordance with the present invention.

Figure 2 is an end view of the same observing the details in the direction from right to left in Figure 1.

Figure 3 is a view looking at the opposite end of the structure, that is, observing it in a direction from left to right in Figure 1.

Figure 4 is a cross section taken on the line 4—4 of Figure 1.

The entire assembly may well be seen by examining Figure 1, wherein it will be observed that the reference numeral 5 designates the power-take-off shaft. This is preferably constructed with a polygonal portion 6 at one end which may be conveniently coupled by a socket or the like (not shown), to the main source of power. The opposite end portion is tapered as at 7 and terminates in the reduced screw-threaded terminal 8. A hub 9 is keyed on this tapered end portion and is provided with an outstanding flange 10 to which the different appliances (not shown) may be bolted or otherwise fastened. The hub is also formed with screw threads as at 11 to accommodate a retaining nut for the appliance (not shown).

The reference character 12 designates a washer and 13 a retaining nut and 14 a retaining pin. Interposed between the flange 10 and the shoulder forming collar 15 is the bearing housing. Incidently, the collar 15 is held in place by a set screw 16. The housing comprises a tubular casing 17 formed at one end with a concaved portion 18 equipped with an attaching flange 19. It might be stated here that this particular flange was primarily designed to permit it to be fastened to the universal joint in the model T Ford engine.

In other words, in accordance with the invention and existing rear half of the universal joint is removed and the flange 19 is substituted therefor thus permitting the coupling between the engine crank shaft (not shown) and the shaft 5 to be conveniently made without requiring further alterations in the stock part. The numeral 20 merely designates an oil cup.

Within the housing is a bushing 21 surrounded by an assembly of roller bearings designated by the numeral 22. Interposed between the roller bearings at the left hand end of the aforesaid collar 15 is a suitable thrust bearing generally designated at 23.

The gist of the invention it will be understood, is in the provision of a relatively stationary housing including appropriate bearing and thrust means to accommodate the shaft 5. The shaft 5 being constructed at the end 6 to permit it to be conveniently fastened to the engine shaft (not shown) and the opposite portion being equipped with a hub structure which permits detachable placement of the different appliances thereon for transmitting the power. As before stated, these appliances may be in the nature of pulleys, gears, sprocket wheels or the like. In this way, the farmer may employ readily obtainable parts for application to this particular device so that it is of a variable and diversified character.

A careful consideration of the description in connection with the drawings will enable the reader to obtain a clear understanding of the construction, the assembly, the features and advantages and the method of operation. Therefore, a more lengthy description is regarded as unnecessary.

Minor changes in shape, size and materials and re-arrangement of details coming within the field of invention claimed may be resorted to in actual practice if desired.

I claim:

A power take-off device comprising a bearing structure including a housing, a roller bearing assembly therein and a thrust bearing in the inner end of the assembly, a shaft rotatably arranged in said bearing structure and having its ends projecting therefrom, a collar adjustably connected with the shaft adjacent its inner end and engaging a part of the thrust bearing, a hub spinning on the outer end of the shaft said hub having an apertured flange on its inner end formed with an annular flange engaging the outer end of the housing of the bearing structure.

In testimony whereof I affix my signature.

BROR NASTROM.